US012748795B2

(12) United States Patent
Lee et al.

(10) Patent No.: US 12,748,795 B2
(45) Date of Patent: Sep. 29, 2026

(54) SERVER, METHOD, AND NON-TRANSITORY COMPUTER-READABLE RECORDING MEDIUM FOR SEARCHING FOR VECTOR

(71) Applicant: Dnotitia Inc., Seoul (KR)

(72) Inventors: Seung Jae Lee, Hwaseong-si (KR); Hong Chan Roh, Seongnam-si (KR); Moo Hyeon Nam, Seoul (KR); Moo Kyoung Chung, Yongin-si (KR)

( * ) Notice: Subject to any disclaimer, the term of this patent is extended or adjusted under 35 U.S.C. 154(b) by 0 days.

(21) Appl. No.: 19/170,133

(22) Filed: Apr. 4, 2025

(65) Prior Publication Data

US 2025/0315464 A1 Oct. 9, 2025

(30) Foreign Application Priority Data

Apr. 5, 2024 (KR) ........................ 10-2024-0046676

(51) Int. Cl.
*G06F 16/901* (2019.01)
*G06F 16/31* (2019.01)
*G06F 16/334* (2025.01)

(52) U.S. Cl.
CPC ........ *G06F 16/3347* (2019.01); *G06F 16/316* (2019.01)

(58) Field of Classification Search
None
See application file for complete search history.

(56) References Cited

U.S. PATENT DOCUMENTS 7,181,438 B1 * 2/2007 Szabo ................ G06Q 30/0269 705/14.27
2021/0406321 A1 * 12/2021 Li ....................... G06F 16/2237

FOREIGN PATENT DOCUMENTS

KR 10-2649675 B1 3/2024

OTHER PUBLICATIONS

Qianxi Zhang; VBase: Unifying Online Vector Similarity Search and Relational Queries via Relaxed Monotonicity; Proceedings of the 17th USENIX Symposium on Operating Systems Design and Implementation; pp. 1-20 (Year: 2013).*
Korean Office Action dated Feb. 6, 2026 and issued by Korean Intellectual Property Office in counterpart Korean Application No. 10-2024-0046676.

* cited by examiner

*Primary Examiner* — Ann J Lo
*Assistant Examiner* — Jermaine A Mincey
(74) *Attorney, Agent, or Firm* — USX IP LLC

(57) ABSTRACT

Provided are a server, method, and computer-readable recording medium for searching for a vector. The method includes generating a vector index structure of data points, searching for a node similar to a query vector using the vector index structure, calculating a similarity between the node and the query vector, and updating the similarity by giving a weight to a vector index inflow time of the node.

8 Claims, 7 Drawing Sheets

SERVER, METHOD, AND NON-TRANSITORY COMPUTER-READABLE RECORDING MEDIUM FOR SEARCHING FOR VECTOR

CROSS-REFERENCE TO RELATED APPLICATION

This application claims priority to and the benefit of Korean Patent Application No. 10-2024-0046676, filed on Apr. 5, 2024, the disclosure of which is incorporated herein by reference in its entirety.

BACKGROUND

1. Field of the Invention

The present disclosure relates to a device and method for accelerating a high-dimensional vector search.

2. Discussion of Related Art

With more companies trying to apply generative artificial intelligence (AI) to their internal systems, technologies are being developed to help companies use large language models (LLMs) more effectively. A technology architecture for making up LLMs, including a development framework such as LangChain or LlamaIndex, in-context learning, a vector database (DB), and the like, is attracting attention.

In particular, a vector DB stores unstructured data such as tables, graphs, images, videos, and audio, and supports searching unlabeled content. A vector DB not only provides a new level of capability to search for unstructured data but also handles semi-structured data and structured data, which is an important factor in utilizing an LLM.

SUMMARY OF THE INVENTION

The present disclosure is directed to providing a vector search device and method for improving the efficiency of a service for generating a response to a query on the basis of a vector database (DB) by accelerating a vector search.

The present disclosure is also directed to providing a vector search device and method for applying the importance of data changing over time to vector similarity calculation with reference to a human memory model.

Objects to be achieved by the present disclosure are not limited to those described above, and other objects which have not been described will be clearly understood by those skilled in the technical field to which the present disclosure pertains from the specification and accompanying drawings.

According to an aspect of the present disclosure, there is provided a method of searching for a vector including generating a vector index structure of data points, searching for a node similar to a query vector using the vector index structure, calculating a similarity between the node and the query vector, and updating the similarity by giving a weight to a vector index inflow time of the node.

According to another aspect of the present disclosure, there is provided a server for searching for a vector including a communication unit configured to receive a query and a processor. The processor generates a vector index structure of data points, searches for a node similar to a query vector using the vector index structure, calculates a similarity between the node and the query vector, and updates the similarity by giving a weight to a vector index inflow time of the node.

According to another aspect of the present disclosure, there is provided a computer-readable recording medium on which a computer program executed by a computer is recorded, the computer program including generating a vector index structure of data points, searching for a node similar to a query vector using the vector index structure, calculating a similarity between the node and the query vector, and updating the similarity by giving a weight to a vector index inflow time of the node.

Solutions to the objects of the present disclosure are not limited to those described above, and other solutions which have not been described will be clearly understood by those skilled in the technical field to which the present disclosure pertains from the specification and accompanying drawings.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
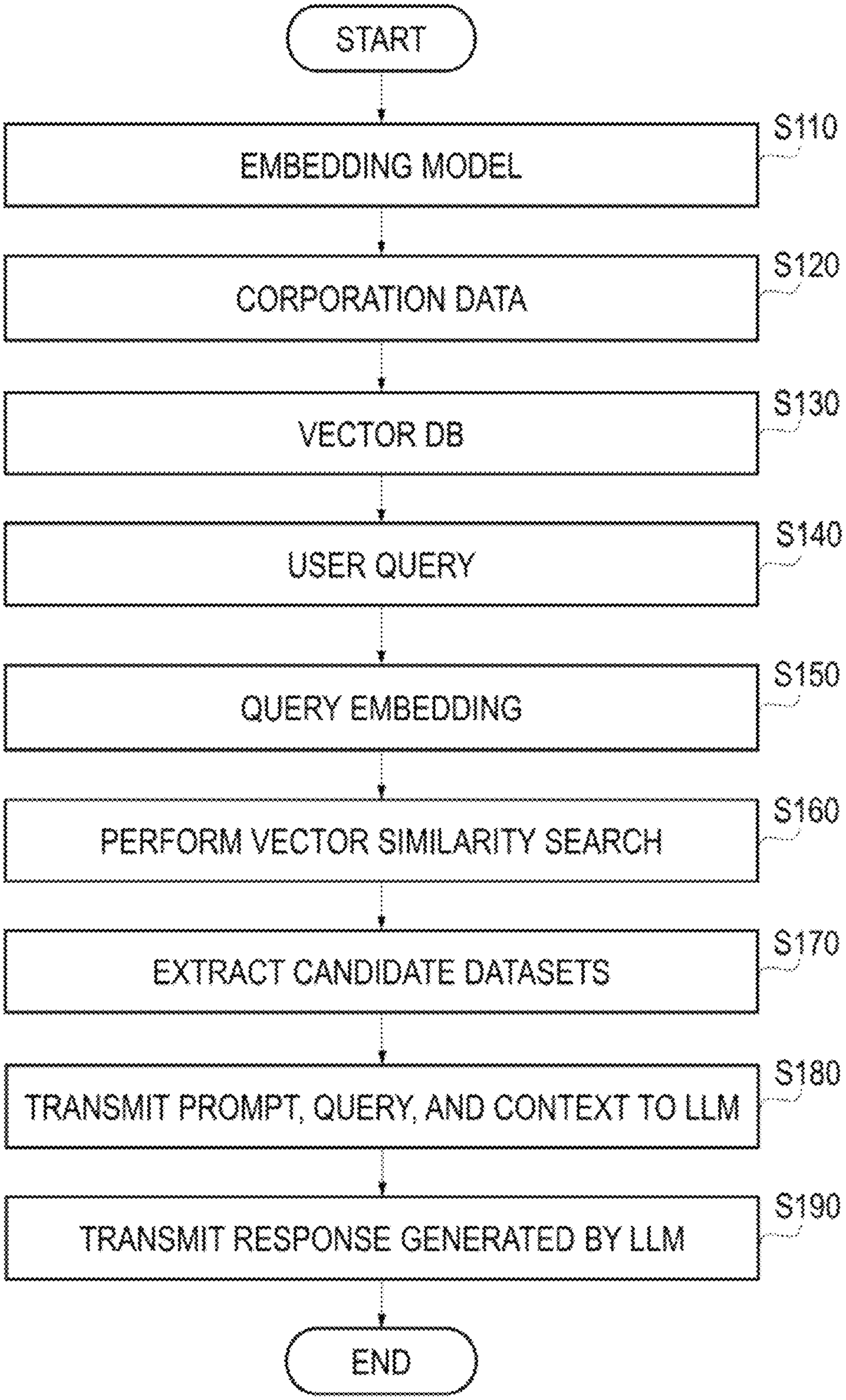
FIG. 1 is a flowchart illustrating a method of extracting candidate datasets for a query from corporation data and requesting a large language model (LLM) to generate a response to the query according to an exemplary embodiment of the present disclosure.

Hereinafter, exemplary embodiments of the present disclosure will be described with reference to the accompanying drawings.

However, embodiments of the present disclosure may be modified into several different forms and the scope of the present disclosure is not limited to the embodiments set forth herein. In addition, these embodiments of the present disclosure are provided to completely describe the present disclosure to those skilled in the technical field to which the present disclosure pertains.

In other words, the above-described objects, features, and advantages will be described in detail below with reference to the accompanying drawings, and accordingly, those skilled in the art will be able to easily implement the technical spirit of the present disclosure. Detailed description of the known art related to the present disclosure that may unnecessarily obscure the gist of the present disclosure will be omitted. Exemplary embodiments of the present disclosure will be described with reference to the accompanying drawings. In the drawings, the same reference numerals are used to indicate the same or similar components.

In addition, singular forms used herein are intended to include plural forms unless the context clearly indicates otherwise. In this specification, it is to be noted that the terms "comprising," "including," and the like are not construed as necessarily including several components or several operations described herein and some of the components or operations may not be included or additional components or operations may be further included.

Further, to describe a system according to the present disclosure, various components and sub-components thereof will be described below. These components and their sub-components may be implemented in various forms such as hardware, software, or a combination thereof. For example, each element may be implemented as an electronic configuration for performing a corresponding function, or may be implemented as software itself that can be run on an electronic system or as one functional element of such software. Alternatively, each element may be implemented as an electronic configuration and driving software corresponding thereto.

Various techniques described herein may be implemented with hardware or software, or a combination of both when appropriate. As used herein, the terms "unit," "server," "system," and the like refer to a computer-related entity, that is, hardware, a combination of hardware and software, or an equivalent to software or software in execution. In addition, each function executed in the system of the present disclosure may be configured in module units and recorded in one physical memory or distributed between two or more memories and recording media.

Although various flowcharts are disclosed to describe embodiments of the present disclosure, this is for convenience of description of each operation, and each operation is not necessarily performed according to the order shown in the flowchart. In other words, operations in a flowchart may be performed simultaneously with each other, performed in an order according to the flowchart, or performed in the reverse order of the flowchart.

FIG. 1 is a flowchart illustrating a method of extracting candidate datasets for a query from corporation data and requesting a large language model (LLM) to generate a response to the query according to an exemplary embodiment of the present disclosure.

To adopt generative artificial intelligence (AI) in a corporation, a service of building a database (DB) of corporation data (e.g., internal corporation data), which is not providable as training data to an LLM, retrieving candidate datasets for a query from the DB, and transmitting the query and the candidate datasets to the LLM may be taken into consideration. Such a service model allows the corporation to query internal corporation data on the basis of natural language without having to provide the internal corporation data to the LLM and receive an answer generated for the query.

According to the exemplary embodiment of the present disclosure for this purpose, in operation S110 of FIG. 1, a service server may prepare a vector embedding model. Vector embedding is the mapping of structured data and/or unstructured data, such as text, images, voice, tables, graphs, and the like, into a multidimensional vector space in accordance with data features. In this way, the semantic similarity between data may be measured. Vector embedding may be performed in various ways, and the present disclosure is not construed as being limited to a specific method.

In operation S120, the service server may acquire corporation data of a corporation to be served. The corporation data may include unstructured data such as portable document format (PDF) files, tables, graphs, charts, videos, and the like. The service server may allocate tenants for the target corporation and apply the corporation data to the vector embedding model to express features of the corporation data as a vector value.

In operation S130, the service server may structure the corporation data as a vector DB.

Here, an index may be generated to effectively search for a high-dimensional vector dataset. Indexing may be performed in various ways, and the present disclosure is not construed as being limited to a specific method.

The vector DB according to the exemplary embodiment of the present disclosure may be expressed as a graph including nodes which represent feature values of data points of the corporation data, and edges which represent the correlations between the plurality of nodes. Here, the graph may be formed with a hierarchical structure.

For example, vectors of data points may be expressed as nodes in the graph, and neighboring vectors may be connected by edges. Further, a plurality of layers may be formed, and a hierarchical structure may be generated by forming all nodes in a bottom layer and forming increasingly fewer nodes in upper layers.

Vector indexes with such a data structure are intended for effective search and thus may be stored in a dynamic random access memory (DRAM). With regard to vector indexes, various data management techniques may be employed to satisfy limited memory space and the requirement of a high data access rate.

According to the exemplary embodiment of the present disclosure, to optimize the storage of vector indexes, importance may be given to each node in collective consideration of the minimum number of hops from a starting node, the frequency of data access, and the time of latest access, and vector indexes may be managed on the basis of a priority queue. For example, a memory space may be allocated for vector indexes in the form of the priority queue such that a node with low importance may be deleted from the memory or moved to a disk.

More specifically, according to the exemplary embodiment of the present disclosure, the importance of each node may be calculated by applying variables h, r, f, $\alpha$, $\beta$, and $\gamma$. The variables have the following meanings.

h: the minimum number of hops from a starting node to a corresponding node r: the time that has elapsed since the last access time of a data item f: the total number of accesses to a data item $\alpha$: a weight representing the importance of the minimum number of hops $\beta$: a weight representing the importance of the time that has elapsed since the last access time of a data item $\gamma$: a weight representing the importance of the total number of accesses to a data item The importance of a node according to the exemplary embodiment of the present disclosure may be calculated on the basis of Equation 1.

$$C = \alpha \cdot (1/h) + \beta \cdot (1/r) + \gamma \cdot f \quad \text{[Equation 1]}$$

Meanwhile, the importance of a node is used when a vector index is deleted from a memory or moved to a disk.

According to an additional embodiment of the present disclosure, a threshold for the importance of a node may be dynamically adjusted in accordance with a system state and a performance goal.

When the service server receives a user's query in operation S140, the service server may express the query as a vector value by applying the query to a vector embedding model in operation S150. This is intended to search corporation data for data similar to the query.

Subsequently, in operation S160, the service server may perform a vector similarity search. In other words, the service server may search the vector DB for candidate datasets on the basis of the similarities between corporation data vectors and a query vector.

For example, a vector similarity search method may be used. According to the vector similarity search method, the query vector may be compared with all corporation data vectors to calculate the distances therebetween, and candidate datasets may be generated in increasing order of distance. This method is very accurate but takes a long time.

Therefore, to provide some balance between search speed and search quality, approximate nearest neighbor (ANN) search may be used. This is an algorithm for effectively searching for the nearest data in high-dimensional data, and ANN search according to the exemplary embodiment of the present disclosure will be described below with reference to the accompanying drawings.

In particular, according to the exemplary embodiment of the present disclosure, the importance of data changing over time may be applied to a vector similarity search. More specifically, a vector similarity according to the exemplary embodiment of the present disclosure may be calculated by a weighted sum of cosine similarities based on angle (or Euclidean similarities based on Euclidean distance) and weights that may change in accordance with the time when a data point is recorded in a vector index. In other words, a vector similarity may be calculated using Equation 2.

$$F=\alpha\cdot s+(1-\alpha)\cdot w(t),\ w(t)=w_0\cdot e^{-\lambda\sqrt{t}} \qquad \text{[Equation 2]}$$

In Equation 2, F is a vector similarity, s is a cosine similarity based on angle or a Euclidean similarity based on Euclidean distance, and w(t) is a weight changing in accordance with the time to reflect the forgetting curve of a human memory model. α is a weight parameter for combining the similarity s with the weight w(t).

According to this exemplary embodiment of the present disclosure, even when nodes have the same cosine similarity s with the query vector, vector similarities F of nodes recorded on the vector DB a long time ago may be calculated lower than vector similarities F of other nodes.

Meanwhile, according to an additional embodiment of the present disclosure, the value of w(t) may be periodically updated. According to the exemplary embodiment of the present disclosure, when a vector is added to a vector index, a timestamp is recorded, and in this way, a change of the importance of data over time may be applied to the calculation of a vector similarity F in real time.

Subsequently, in operation S170, the service server may extract candidate datasets on the basis of a vector similarity F with the query vector.

Subsequently, in operation S180, the service server may transmit the query, the candidate datasets, and context to the LLM together with a prompt that is to obtain an appropriate response. The LLM may generate a response required by the user on the basis of the received data even though the data has not been learned.

In operation S190, the service server may transmit the response received from the LLM to the user.

Figure 2:
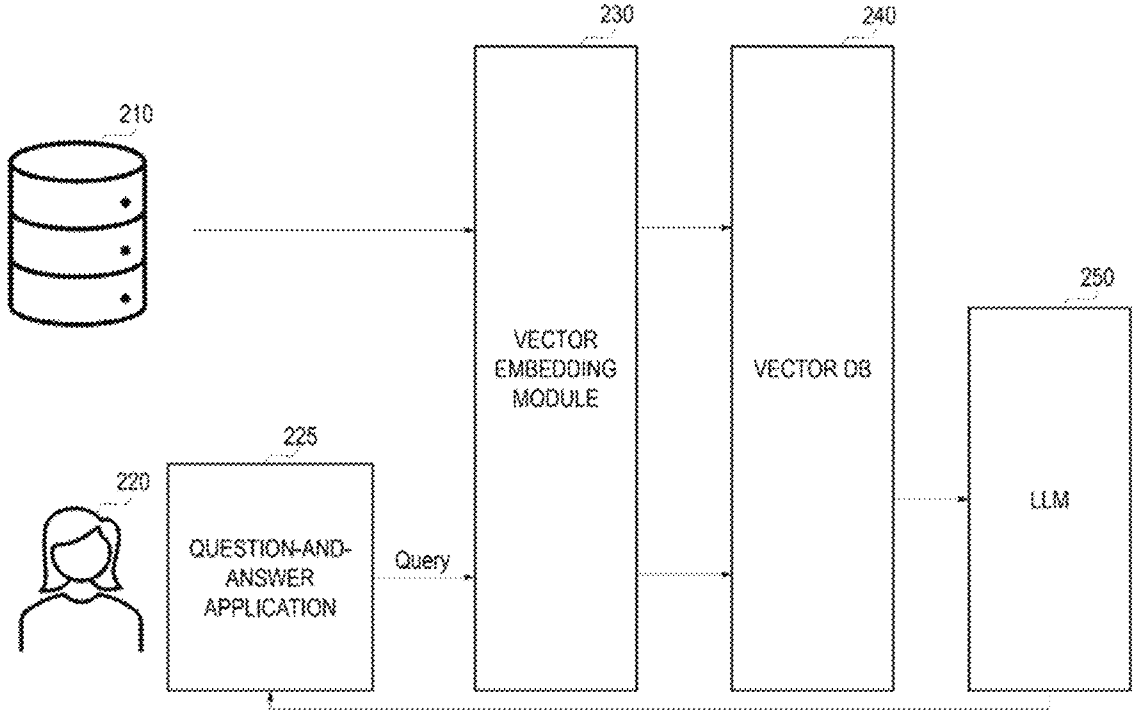
FIG. 2 is a diagram illustrating a structure of a system for extracting candidate datasets for a query from corporation data and requesting an LLM to generate a response to the query according to an exemplary embodiment of the present disclosure.

FIG. 2 is a diagram illustrating a structure of a system for extracting candidate datasets for a query from corporation data and requesting an LLM to generate a response to the query according to an exemplary embodiment of the present disclosure.

Each block of FIG. 2 is intended to describe the structure of a system according to an exemplary embodiment of the present disclosure. Each block is not construed as being limited to each individual physical device and may include virtualized computing resources.

Referring to FIG. 2, the system according to the exemplary embodiment of the present disclosure may include a storage 210, a question-and-answer application 225, a vector embedding module 230, a vector DB 240, and/or an LLM 250.

The storage 210 of FIG. 2 stores corporation data, for example, internal corporation data. The storage 210 may perform a function of storing structured data and/or unstructured data that is not providable to the LLM 250 as training data.

The vector embedding module 230 of FIG. 2 performs vector embedding. To this end, the vector embedding module 230 may include a vector embedding model. Vector embedding is the mapping of structured data and/or unstructured data, such as text, images, voice, tables, graphs, and the like, into a multidimensional vector space in accordance with data features. In this way, the semantic similarity between data may be measured. Vector embedding may be performed in various ways, and the present disclosure is not construed as being limited to a specific method.

The vector DB 240 of FIG. 2 may be expressed as a graph including nodes which represent feature values of data points of the corporation data, and edges which represent the correlations between the plurality of nodes. Here, the graph may be formed with a hierarchical structure. When the vector embedding module 230 is applied, the data of the storage 210 may be embedded, and indexes may be formed in the vector DB 240 to effectively search a high-dimensional vector dataset.

Meanwhile, a user 220 of FIG. 2 may input a natural language query through the question-and-answer application 225 provided by the system according to the exemplary embodiment of the present disclosure. When the vector embedding module 230 is applied, the user query may be expressed as a vector value. This is intended to search the vector DB 240 for candidate datasets on the basis of a vector similarity with the query vector.

When candidate datasets are extracted from the vector DB 240 of FIG. 2 on the basis of a vector similarity with the query vector, the LLM 250 may receive the query, the candidate datasets, and context together with a prompt. Subsequently, when the LLM 250 returns a response to the question-and-answer application 225, the user 220 may view the response to the query.

Figure 3A:
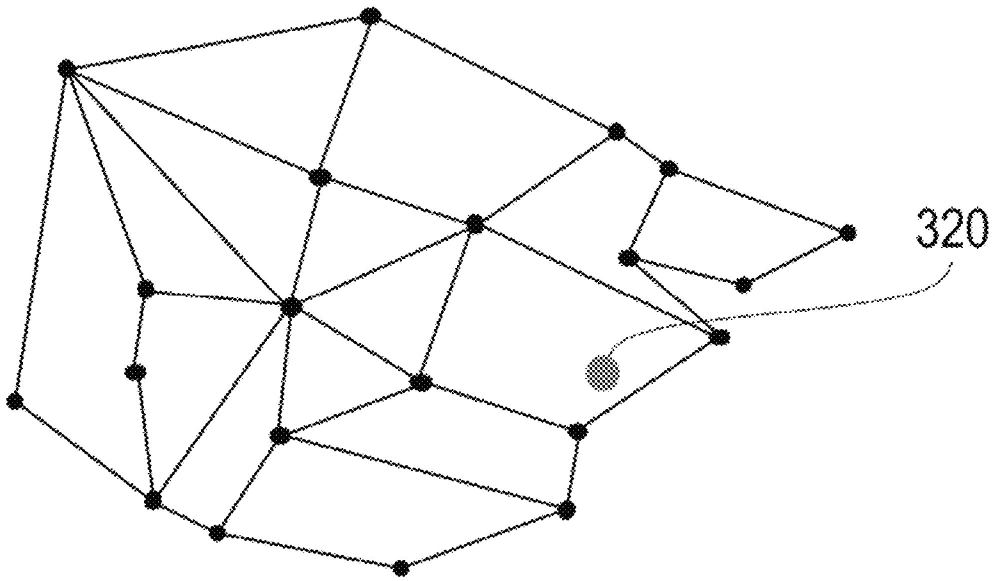
FIGS. 3A and 3B are diagrams illustrating a vector index structure generated according to an exemplary embodiment of the present disclosure and a query search method.
Figure 3B:
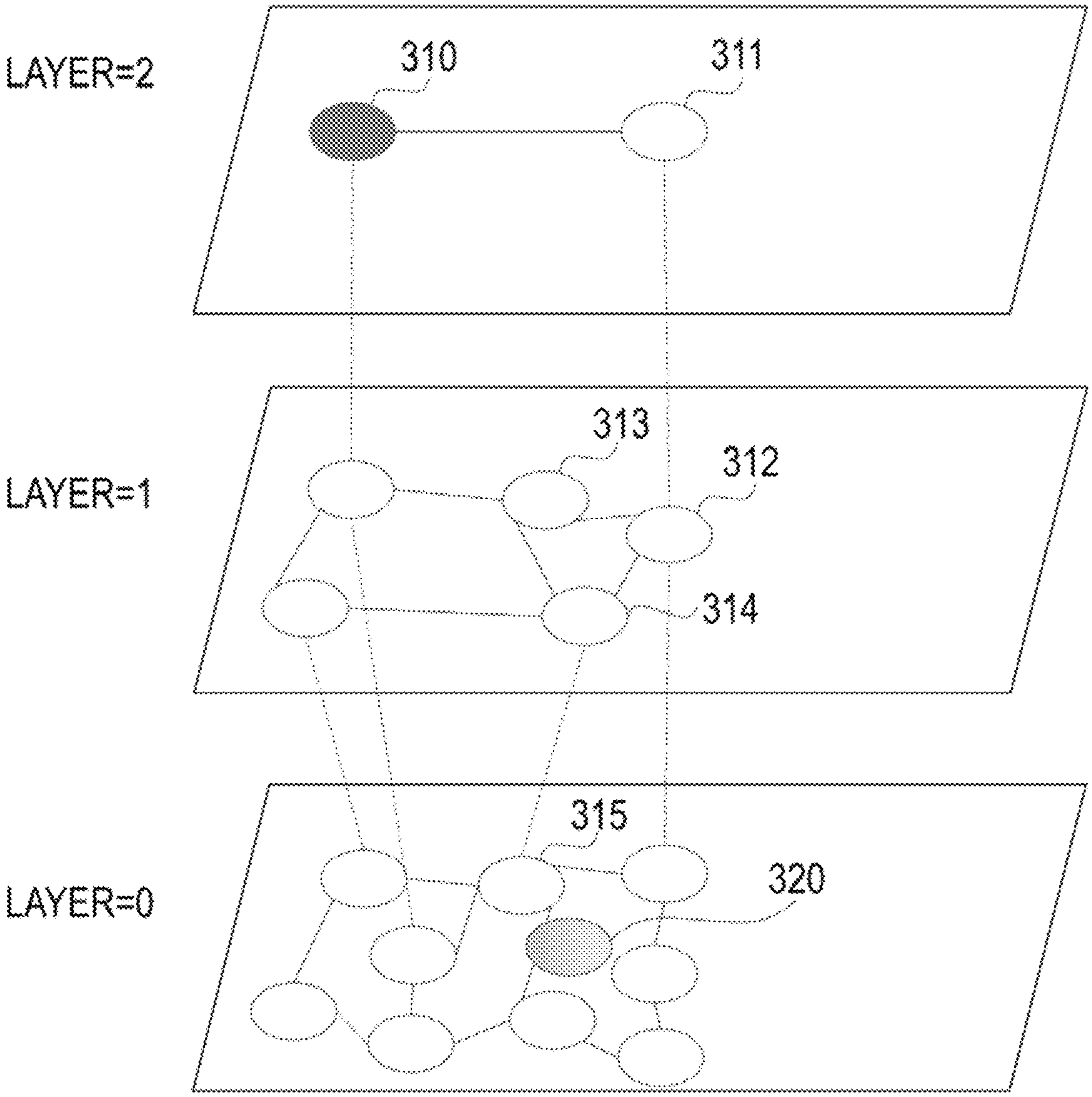

FIGS. 3A and 3B are diagrams illustrating a vector index structure generated according to an exemplary embodiment of the present disclosure and a query search method.

The vector index structure according to the exemplary embodiment of the present disclosure may be expressed as a graph including nodes which represent feature values of data points, and edges which represent the correlations between the plurality of nodes. Here, the graph may be formed with a planar structure as shown in FIG. 3A or formed with a hierarchical structure as shown in FIG. 3B.

When vector indexes according to the exemplary embodiment of the present disclosure are generated with a hierarchical structure, as shown in layer 0 of FIG. 3B, layer 0 which is a bottom layer may include all nodes of data points and may be configured by connecting only similar nodes using horizontal edges. Further, as shown in layer 1 of FIG. 3B, layer 1 which is a upper layer than layer 0 may be configured by probabilistically extracting some nodes from layer 0 and connecting only similar nodes among the extracted nodes using horizontal edges. Similarly, layer 2 which is a upper layer than layer 1 may be configured by probabilistically extracting some nodes from layer 1 and connecting similar nodes among the extracted nodes using horizontal edges. The vector index structure according to the exemplary embodiment of the present disclosure may be formed with a hierarchical structure by extracting increasingly fewer nodes from upper layers and connecting a node of an upper layer and a node of a lower layer which are similar to each other using a vertical edge.

Meanwhile, in the example of FIG. 3A or 3B, according to the exemplary embodiment of the present disclosure when a query vector 320 is input, vector indexes of FIG. 3A or FIG. 3B can be used to rapidly search for nodes similar to the query vector 320. More specifically, a search begins at a starting node, and the distances from the starting node and neighboring nodes of the starting node are calculated to move the search to a node with the shortest distance from the starting node. By repeating a process of calculating the distances from the moved node and neighboring nodes of the moved node and moving the search to a node with the shortest distance from the corresponding node, it is possible to rapidly search for a node nearest to the query vector 320.

When a vector index has a hierarchical structure as shown in FIG. 3B, a search begins at a starting node 310 of layer 2 which is a top layer and moves to a node 311 close to a query node 320. Subsequently, when it is not possible to move from the node 311 closer to the query node 320, the search may move to a node 312 of layer 1, a lower layer of layer 2, connected to the node 311. Subsequently, the search moves from the node 312 to a node 314 close to the query node 320. When it is not possible to move from the node 314 closer to the query node 320, the search may move to a node 315 of layer 0, a lower layer of layer 1, connected to the node 314. By repeating this approach until the search moves closest to the query node 320, it is possible to search for the node 315 closest to the query node 320.

This search approach may be referred to as ANN index search, which makes it possible to efficiently search high-dimensional data for the closest data. In such an ANN index search, a cosine similarity algorithm based on angle or a Euclidean similarity algorithm based on Euclidean similarity may be used to calculate a vector similarity.

Figure 4:
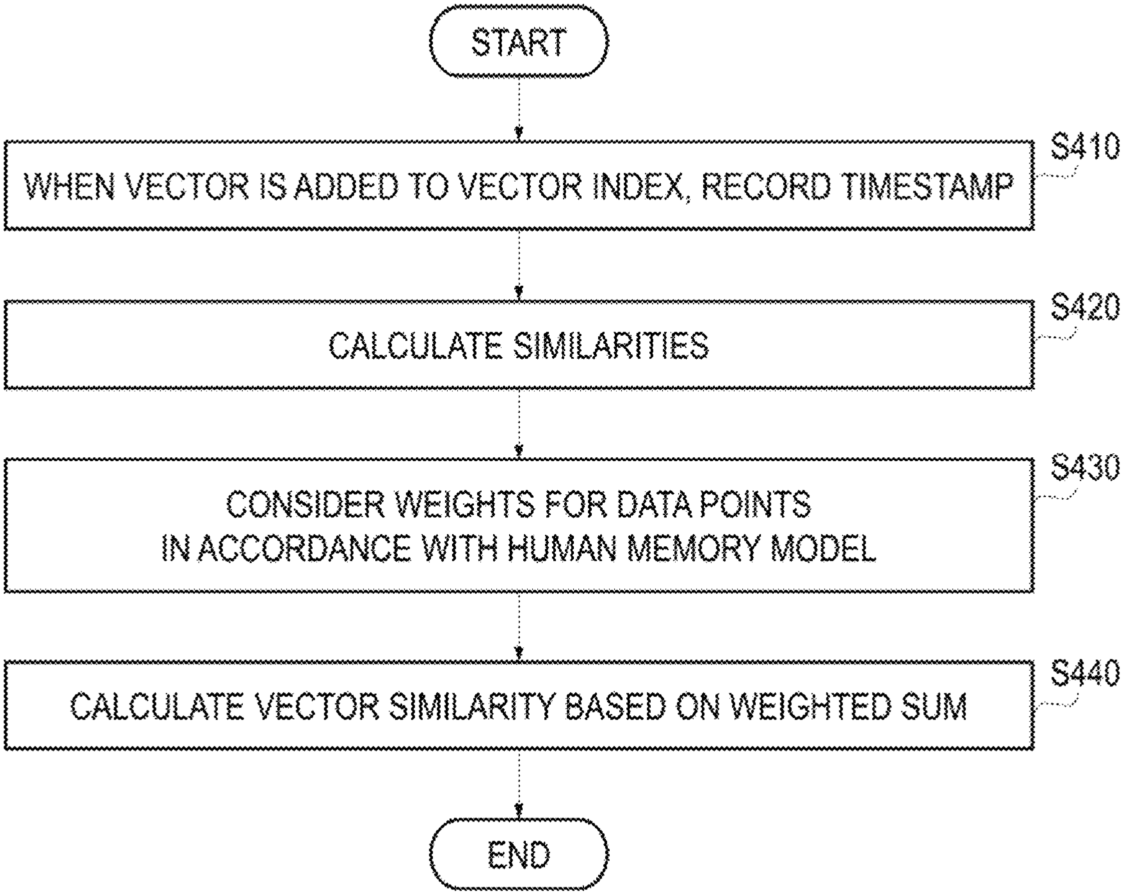
FIG. 4 is a flowchart illustrating a method of applying a time weight to a vector similarity search according to an exemplary embodiment of the present disclosure.

FIG. 4 is a flowchart illustrating a method of applying a time weight to a vector similarity search according to an exemplary embodiment of the present disclosure.

In operation S410, when a vector is added to a vector index, a timestamp may be recorded. This is intended to apply a change of importance over time to vector similarity calculation on the basis of a data inflow time.

In operation S420, similarities between vectors may be calculated. The similarity between vectors may be a cosine similarity based on angle or a Euclidean similarity based on Euclidean distance. The similarity between vectors may be calculated in accordance with various algorithms, and the present disclosure is not construed as being limited to a specific algorithm.

In operation S430, weights for data points based on a human memory model may be taken into consideration to apply the importance of data changing over time to a vector similarity search.

In operation S440, a vector similarity may be calculated. More specifically, a vector similarity according to the exemplary embodiment of the present disclosure may be calculated by a weighted sum of cosine similarities based on angle (or Euclidean similarities based on Euclidean distance) and weights that may change in accordance with the time when a data point is recorded in a vector index.

The vector similarity may be calculated on the basis of Equation 2 "$F=\alpha \cdot s+(1-\alpha) \cdot w(t)$, $w(t)=w_0 \cdot e^{-\lambda\sqrt{t}}$" described above. Here, F is a vector similarity, s is a cosine similarity based on angle or a Euclidean similarity based on Euclidean distance, and w(t) is a weight changing in accordance with the time to reflect the forgetting curve of the human memory model. $\alpha$ is a weight parameter for combining the similarity s with the weight w(t).

According to another exemplary embodiment of the present disclosure, a weight for similarity calculation may be given to each node in comprehensive consideration of the frequency of data access, that is, a frequency r at which a node is used for vector similarity searches, a frequency f at which a node is derived as closest data, and a data inflow time t.

This is intended to apply a human memory model to vector similarity calculation. People gradually forget old information, value information that they think about often, and remember similar or related information for a long time. In line with this, according to the present disclosure, the importance of each node may be calculated in accordance with the data inflow time t to which the forgetting curve of a human memory model is applied, the frequency f at which the node is derived as closest data, and the correlation r of the node with the closest data, and the importance of each node may be applied to vector similarity calculation.

Meanwhile, according to an additional embodiment of the present disclosure, the value of w(t) may be periodically updated. According to the exemplary embodiment of the present disclosure, when a vector is added to a vector index, a timestamp is recorded, and in this way, a change of the importance of data over time may be applied to vector similarity calculation in real time.

Figure 5:
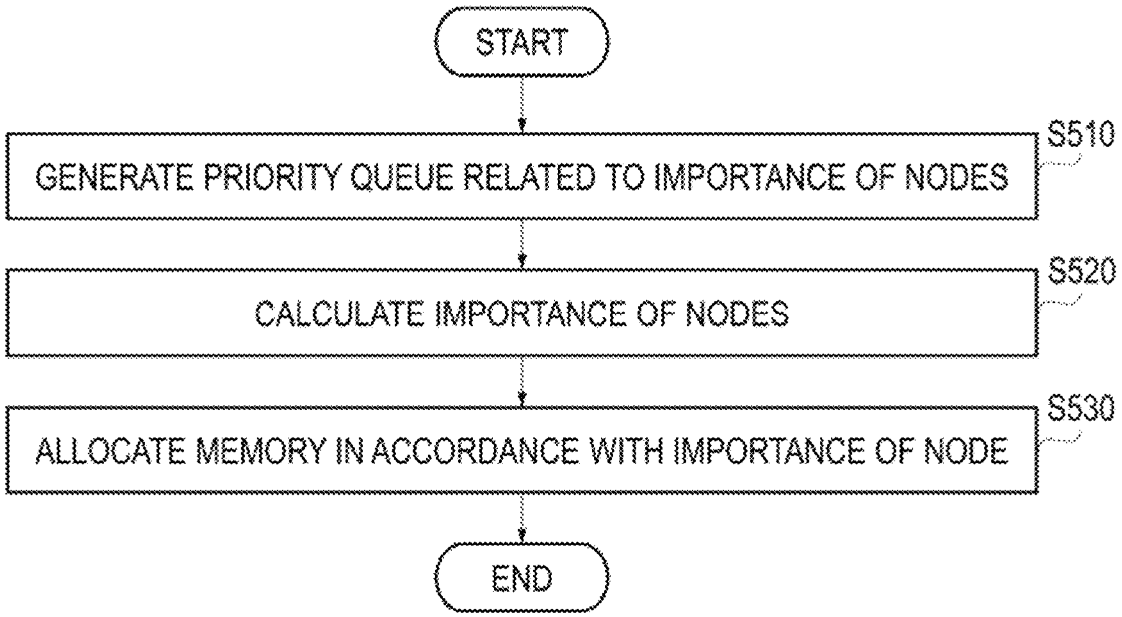
FIG. 5 is a flowchart illustrating a method of managing a memory for storing vector indexes according to an exemplary embodiment of the present disclosure.

FIG. 5 is a flowchart illustrating a method of managing a memory for storing vector indexes according to an exemplary embodiment of the present disclosure.

In operation S510, a service server may generate a priority queue related to the importance of nodes to optimize the storage of vector indexes.

In operation S520, the service server may calculate the importance of nodes.

More specifically, according to the exemplary embodiment of the present disclosure, the service server may calculate the importance of each node in accordance with one or more of the minimum number of hops from a starting node, the frequency of data access, and the time of latest access. Here, the importance of each node may be calculated on the basis of Equation 1 "$C=\alpha \cdot (1/h)+\beta \cdot (1/r)+\gamma \cdot f$" described above. Here, h is the minimum number of hops from a starting node, r is the time that has elapsed since the last access time of a data item, f is the total number of accesses to a data item, $\alpha$ is a weight representing the importance of the minimum number of hops, $\beta$ is a weight representing the importance of the time that has elapsed since the last access time of a data item, and $\gamma$ is a weight representing the importance of the total number of accesses to a data item.

In operation S530, the service server may allocate memory on the basis of the importance of nodes. For example, beginning with a node with low importance, the vector indexes of nodes may be deleted from the memory or moved to a disk. Like this, the importance of a node is used to delete the vector index from the memory or move the vector index to a disk. According to an additional embodiment of the present disclosure, a threshold for the importance of a node may be dynamically adjusted in accordance with a system state and a performance goal.

Figure 6:
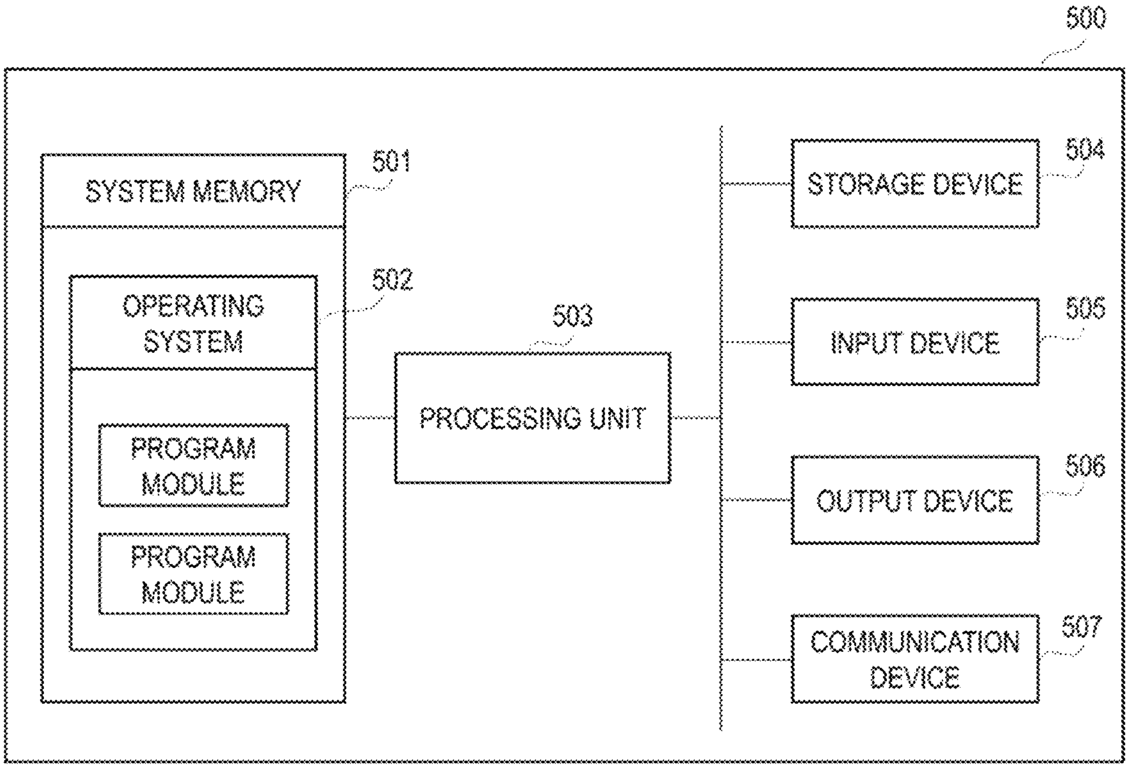
FIG. 6 is a diagram illustrating a computing operating environment of a service server according to an exemplary embodiment of the present disclosure.

FIG. 6 is a diagram illustrating a computing operating environment of a service server according to an exemplary embodiment of the present disclosure.

FIG. 6 provides general and simplified illustration of an appropriate computing environment in which exemplary embodiments of a service server are implementable. Referring to FIG. 6, a computing device 500 is shown as an example of a service server.

The computing device 500 may at least include a processing unit 503 and a system memory 501.

The computing device 500 may also include a plurality of processing units that cooperate when the computing device 500 executes a program.

Depending on the exact configuration and type of the computing device 500, the system memory 501 may be a volatile memory (e.g., a RAM), a non-volatile memory (e.g., a ROM, a flash memory, or the like), or a combination thereof. The system memory 501 includes a suitable operating system (OS) for controlling operations of a platform such as the Windows OS of Microsoft Corporation. The system memory 501 may include one or more software applications such as a program module, an application, and the like.

The computing device 500 may include an additional data storage device 504 such as a magnetic disk, an optical disc, or a tape. This additional storage device 504 may be a removable storage and/or stationary storage. Computer-readable storage media may include volatile and non-volatile media and removable and stationary media that are implemented for storage information, such as computer-readable instructions, data structures, program modules, or other data, using any method or technique.

Both of the system memory 501 and the storage device 504 are merely examples of the computer-readable storage media. The computer-readable storage media may include, but are not limited to, memory devices such as a RAM, a ROM, an electrically erasable programmable ROM (EEPROM), a flash memory, and others, optical storages such as a compact disc (CD)-ROM, a digital versatile disc (DVD), and others, magnetic storage devices such as magnetic tape, a magnetic disk storage, and others, and any other media that may store desired information and are accessible by the computing device 500.

An input device 505 of the computing device 500 may include, for example, a keyboard, a mouse, a pen, a voice input device, a touch input device, and a comparative input device. Since the input device 505 is well known in the art, detailed description thereof will be omitted.

An output device 506 of the computing device 500 may include, for example, a display, a speaker, a printer, and other types of output devices. Since the output device 506 is well known in the art, detailed description thereof will be omitted.

The computing device 500 may include a communication device 507 that allows the computing device 500 to communicate with other devices over, for example, a distributed computing environment network, such as a wired or wireless network, a satellite link, a cellular link, or a short-range network, using a comparative mechanism. The communication device 507 is an example of a communication medium, which may include computer-readable instructions, data structures, program modules, or other data therein. Examples of the communication medium may include, but are not limited to, wired media such as a wired network and direct-wired connection, and wireless media such as sound, radio frequency (RF), infrared rays, and others.

Methods according to various embodiments of the present disclosure may be implemented in the form of program instructions executable by various computing devices and may be recorded on a computer-readable medium. The computer-readable medium may include program instructions, data files, data structures, and the like solely or in combination. The program instructions recorded on the medium may be those specially designed and constructed for an embodiment or may be known and available to those of ordinary skill in the computer software field. Examples of the computer-readable recording medium include magnetic media such as a hard disk, a floppy disk, and a magnetic tape, optical media such as a CD-ROM and a DVD, magneto-optical media such as a floptical disk, and hardware devices configured to store and execute program instructions such as a ROM, a RAM, a flash memory, and the like. Examples of program instructions include not only machine language code such as that produced by a compiler but also high-level language code that is executable by a computer using an interpreter or the like. Each of the hardware devices may be configured to operate as one or more software modules to perform operations of an embodiment, and vice versa.

With a device and method for searching for a vector according to exemplary embodiments of the present disclosure, as vector search is accelerated, the efficiency of a service for generating a response to a query on the basis of a vector DB increases.

With a device and method for searching for a vector according to exemplary embodiments of the present disclosure, the importance of data changing over time can be applied to vector similarity calculation with reference to a human memory model.

Effects of the present disclosure are not limited to those described above, and other effects which have not been described will be clearly understood by those skilled in the technical field to which the present disclosure pertains from the specification and accompanying drawings.

Although embodiments have been described above with reference to limited examples and drawings, various modifications and alterations can be made from the description by those of ordinary skill in the art. For example, even when the described techniques are performed in an order different from the described method and/or even when the components of the system, structure, device, circuit, and the like are coupled or combined in a form different from the way described, or replaced or substituted by other components or equivalents, an appropriate result can be achieved.

Therefore, other implementations, other embodiments, and equivalents to the claims fall within the scope of the following claims.

What is claimed is:

1. A method of searching for a vector by a server, the method comprising:

generating a vector index structure of data points, wherein the vector index structure is expressed as a graph including nodes which represent feature values of the data points and edges which represent correlations between a plurality of nodes, and vector indexes corresponding to vectors of the data points are stored in a memory, and wherein the generating of the vector index structure comprises adding the vectors of the data points to the vector indexes and recording timestamps indicating times at which the vectors of the data points are added to the vector indexes such that the timestamps correspond to the vectors of the data points; and searching for a node similar to a query vector using the vector index structure, wherein the searching comprises calculating a similarity between each of the vectors of the nodes and the query vector by using a weight that changes according to a timestamp indicating a time when a vector of a data point among the data points is added to a corresponding vector index among the vector indexes, wherein the method further comprises allocating a memory space for the vector indexes stored in the memory, and wherein the allocating of the memory space comprises:

calculating an importance of each of the nodes based on (i) a time that has elapsed since a last access time of a corresponding node of the nodes, (ii) a minimum number of hops from a starting node of the nodes, and (iii) a total number of accesses to the corresponding node of the nodes, and deleting a vector index of a node having an importance lower than an importance of another node among the nodes from the vector indexes stored in the memory based on the calculated importance of each of the nodes.

2. The method of claim 1, wherein the calculating of the similarity comprises calculating the similarity by weighing at least one of a frequency at which the node is used for vector similarity calculation and a frequency at which the node is derived as closest data, and the generating of the vector index structure comprises forming, as a single layer, the graph including the nodes which represent the feature values of the data points, and the edges which represent the correlations between the plurality of nodes.

3. The method of claim 1, wherein the generating of the vector index structure comprises:

recording all nodes for the data points and only connecting similar nodes using horizontal edges to form a bottom layer; and forming increasingly fewer nodes in upper layers and connecting a node of a lower layer and a node of an upper layer which are similar to each other using a vertical edge to form a hierarchical structure.

4. A server for searching for a vector, the server comprising:

a communication unit configured to receive a query; and a processor, wherein the processor is configured to:

generate a vector index structure of data points, wherein the vector index structure is expressed as a graph including nodes which represent feature values of the data points and edges which represent correlations between a plurality of nodes, and vector indexes corresponding to vectors of the data points are stored in a memory, and wherein the generating of the vector index structure comprises adding the vectors of the data points to the vector indexes and recording timestamps indicating times at which the vectors of the data points are added to the vector indexes such that the timestamps correspond to the vectors of the data points, and search for a node similar to a query vector using the vector index structure, wherein the searching comprises calculating a similarity between each of the vectors of the nodes and the query vector by using a weight that changes according to a timestamp indicating when a vector of a data point among the data points is added to a corresponding vector index among the vector indexes, wherein the processor is further configured to allocate a memory space for the vector indexes stored in the memory, and wherein the allocating of the memory space comprises:

calculating an importance of each of the nodes based on (i) a time that has elapsed since a last access time of a corresponding node of the nodes, (ii) a minimum number of hops from a starting node of the nodes, and (iii) a total number of accesses to the corresponding node of the nodes, and deleting a vector index of a node having an importance lower than an importance of another node among the nodes from the vector indexes stored in the memory based on the calculated importance of each of the nodes.

5. A non-transitory computer-readable recording medium on which a computer program executed by a computer device is recorded, wherein the computer program comprises:

generating a vector index structure of data points, wherein the vector index structure is expressed as a graph including nodes which represent feature values of the data points and edges which represent correlations between a plurality of nodes, and vector indexes corresponding to vectors of the data points are stored in a memory, and wherein the generating of the vector index structure comprises adding the vectors of the data points to the vector indexes and recording timestamps indicating times at which the vectors of the data points are added to the vector indexes such that the timestamps correspond to the vectors of the data points; and searching for a node similar to a query vector using the vector index structure, wherein the searching comprises calculating a similarity between each of the vectors of the nodes and the query vector by using a weight that changes according to a timestamp indicating a time when a vector of a data point among the data points is added to a corresponding vector index among the vector indexes, wherein the computer program further comprises allocating a memory space for the vector indexes stored in the memory, and wherein the allocating of the memory space comprises:

calculating an importance of each of the nodes based on (i) a time that has elapsed since a last access time of a corresponding node of the nodes, (ii) a minimum number of hops from a starting node of the nodes, and (iii) a total number of accesses to the corresponding node of the nodes, and deleting a vector index of a node having an importance lower than an importance of another node among the nodes from the vector indexes stored in the memory based on the calculated importance of each of the nodes.

6. The method of claim 1, wherein the calculating of the importance of each of the nodes comprises calculating the importance of each of the nodes further based on (iv) a weight representing an importance of the time that has elapsed since the last access time, (v) a weight representing an importance of the minimum number of hops, and (vi) a weight representing an importance of the total number of accesses to the corresponding node of the nodes.

7. The server of claim 4, wherein the calculating of the importance of each of the nodes comprises calculating the importance of each of the nodes further based on (iv) a weight representing an importance of the time that has elapsed since the last access time, (v) a weight representing an importance of the minimum number of hops, and (vi) a weight representing an importance of the total number of accesses to the corresponding node of the nodes.

8. The non-transitory computer-readable recording medium of claim 5, wherein the calculating of the importance of each of the nodes comprises calculating the importance of each of the nodes further based on (iv) a weight representing an importance of the time that has elapsed since the last access time, (v) a weight representing an importance of the minimum number of hops, and (vi) a weight representing an importance of the total number of accesses to the corresponding node of the nodes.

* * * * *